Sept. 3, 1929.  R. J. CROSSMAN  1,726,888
FINISHER
Filed Oct. 10, 1927
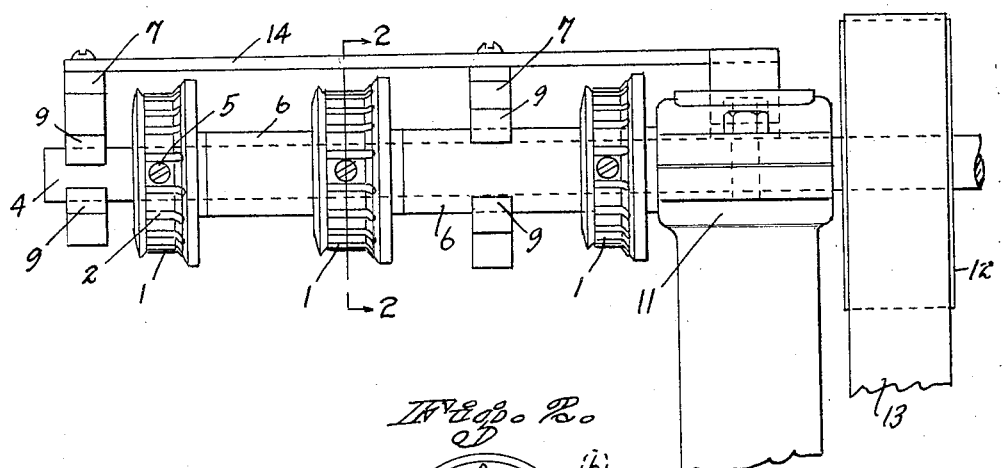
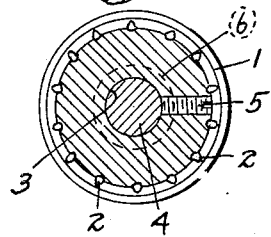
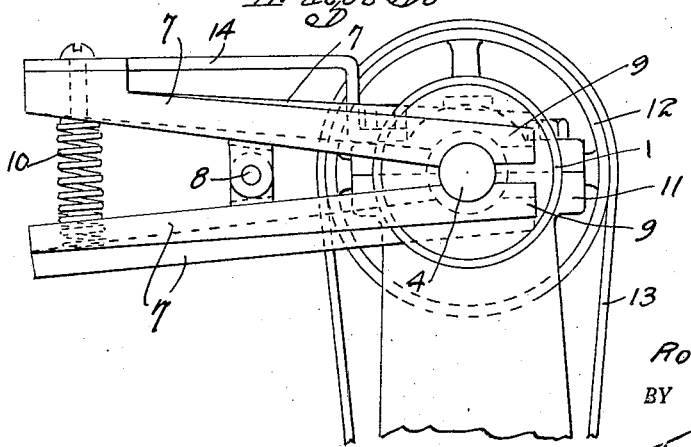
INVENTOR.
ROBERT J. CROSSMAN
BY
ATTORNEYS.

Patented Sept. 3, 1929.

1,726,888

UNITED STATES PATENT OFFICE.

ROBERT J. CROSSMAN, OF SAN FRANCISCO, CALIFORNIA.

FINISHER.

Application filed October 10, 1927. Serial No. 225,362.

My invention relates to improvements in finishers, and it consists in the combination, constructions and arrangements hereinafter described and claimed.

An object of my invention is to provide a finisher especially constructed for shoe-polishing machinery, in which a long shaft is provided for supporting a number of polishing wheels of different shapes, these wheels carrying wax that is kept in a softened condition by a heat mechanism that keeps the wheels warm, whereby any one of the wheels may be used at any time desired without the necessity of first warming up the wheel so as to soften the wax carried thereby.

In all machines of which I am aware, the various shaped wheels are inter-changeable, and if it is desired to use a wheel which is not mounted on the machine it is necessary to apply this wheel to the machine and then to run the machine a sufficient length of time, in order to have the friction heating device warm the wax upon the wheel. This results in a loss of time and it is this very point which the present invention overcomes.

Other objects and advantages will appear in the following specification, and the novel features of my invention will be particularly pointed out in the appended claim.

My invention is illustrated in the accompanying drawing forming a part of this application, in which Figure 1 is a front elevation of the device;

Figure 2 is a section along the line 2—2 of Figure 1; and

Figure 3 is an end elevation of the device.

In Figure 1 it will be noted that I make use of three finisher wheels 1, having grooves 2 therein for receiving wax. The usual construction is to mount only one wheel upon the tapered portion of a shaft, and to change the wheels for different kinds of work.

With my present invention I make the bore 3 of the wheels 1 large enough to permit the wheels to be mounted upon the shaft 4 as shown. I employ spacing collars 6 for separating the wheels one from the other, and set screws 5 for locking them in place.

The means for heating the wheels is shown in Figures 1 and 3, and this means comprises arms 7 pivoted together at 8 and being fashioned into friction shoes at 9. A spring 10 causes the shoes to frictionally engage with the shaft 4 and this construction generates heat when the shaft is rotated.

This heat is transmitted by conduction to the wheels 1, and the temperature of the wheels is raised sufficiently to keep the wax soft.

I have shown the shaft 4 as being mounted in a bearing 11. A pulley 12 is secured to the shaft and in turn is operated by a belt 13 which may be connected to any source of power, such as a driving pulley of a motor not shown.

In Figure 1 I show a plurality of friction shoes 9 all connected together by a cross piece 14.

From the foregoing description of the various parts of the device, the operation thereof may be readily understood. In the usual shoe repair shop the machinery is kept running all day, and the friction created by the shoes 9 will keep the wheels 1 heated at all times. The wheels are of different shapes so as to be adapted for men's shoes, ladies' shoes, etc. It will be seen that it is not necessary for the shoemaker to lose any time when he has to change from one wheel to another, because all of the wheels have wax which is kept softened and ready for instant use.

Although I have shown and described one embodiment of my invention, it is to be understood that the same is susceptible of various changes and I reserve the right to employ such changes as may come within the scope of the appended claim.

I claim:

In a shoe finisher, a revolvably mounted shaft, frictional means contacting directly with said shaft for maintaining the same in a heated condition a plurality of differently shaped wax-carrying finishing wheels mounted on said shaft, sleeves disposed on said shaft for holding said wheels in spaced relation, and frictional means engaging with at least one of said sleeves for maintaining all of the wheels at a wax-softening temperature.

ROBERT J. CROSSMAN.